United States Patent
Uchimura et al.

(10) Patent No.: US 7,605,702 B2
(45) Date of Patent: Oct. 20, 2009

(54) ARTICLE POSITION MANAGEMENT SYSTEM, ARTICLE POSITION MANAGEMENT METHOD, TERMINAL DEVICE, SERVER, AND ARTICLE POSITION MANAGEMENT PROGRAM

(75) Inventors: Jun Uchimura, Tokyo (JP); Hiroki Murayama, Tokyo (JP)

(73) Assignee: NEC Corporation (JP)

( * ) Notice: Subject to any disclaimer, the term of this patent is extended or adjusted under 35 U.S.C. 154(b) by 315 days.

(21) Appl. No.: 11/570,957

(22) PCT Filed: Jun. 20, 2005

(86) PCT No.: PCT/JP2005/011229

§ 371 (c)(1),
(2), (4) Date: Dec. 19, 2006

(87) PCT Pub. No.: WO2006/001237

PCT Pub. Date: Jan. 5, 2006

(65) Prior Publication Data

US 2008/0278324 A1 Nov. 13, 2008

(30) Foreign Application Priority Data

Jun. 25, 2004 (JP) ............................. 2004-188012

(51) Int. Cl.
*G08B 13/14* (2006.01)
(52) U.S. Cl. ............ 340/572.1; 340/572.8; 340/825.49; 235/385
(58) Field of Classification Search .............. 340/572.1, 340/572.8, 825.49, 539.32, 10.41; 235/492, 235/385, 322
See application file for complete search history.

(56) References Cited

U.S. PATENT DOCUMENTS 5,874,724 A * 2/1999 Cato ........................... 235/492
6,078,251 A * 6/2000 Landt et al. .............. 340/10.41

(Continued)

FOREIGN PATENT DOCUMENTS

EP 1 174 834 A2 1/2002

(Continued)

OTHER PUBLICATIONS

"*All about Wireless IC Tag*," Nikkei Business Publications, Inc., Apr. 20, 2004, pp. 70-71 and 111.

(Continued)

*Primary Examiner*—Anh V La
(74) *Attorney, Agent, or Firm*—Ostrolenk Faber LLP (57) ABSTRACT

There is provided an article position management system which can determine where an article is present with high accuracy and manage the position of the article such that no article is left unchecked. Illumination sections (11-14) optically transmit pieces of positional information only to specific regions (lighting ranges (401-404)). A terminal device (31) receives the pieces of positional information transmitted from the illumination sections (11-14) and reads out article IDs from RFID tags (201-206) put on articles (101-106). The terminal device (31) sends the pieces of positional information and article IDs to a server (51) through a wireless LAN base station (41). The server (51) stores the pieces of positional information and article IDs sent from the terminal device (31) such that the pieces of positional information and article IDs are associated with each other.

20 Claims, 6 Drawing Sheets

U.S. PATENT DOCUMENTS

| | | | |
|---|---|---|---|
| 6,357,662 B1 * | 3/2002 | Helton et al. | 235/462.45 |
| 6,693,512 B1 * | 2/2004 | Frecska et al. | 340/10.1 |
| 7,079,034 B2 * | 7/2006 | Stilp | 340/573.1 |

FOREIGN PATENT DOCUMENTS

| | | |
|---|---|---|
| GB | 2 355 876 | 5/2001 |
| JP | 02-163202 | 6/1990 |
| JP | 08-143115 | 6/1996 |
| JP | 10-338498 | 12/1998 |
| JP | 2001-130718 | 5/2001 |
| JP | 2001-340217 | 12/2001 |
| JP | 2003-185730 | 7/2003 |
| JP | 2003-226434 | 8/2003 |
| JP | 2004-147063 | 5/2004 |
| KR | 2002-0097173 | 12/2002 |
| RU | 2 126 980 | 2/1999 |
| WO | 2004/040327 A1 | 12/2002 |
| WO | WO 2004/038962 | 5/2004 |

OTHER PUBLICATIONS

"*Nttcomware Technology*" [online], vol. 8, pp. 12-15, Figs. 2 and 3 [retrieved from the Internet on Jun. 18, 2004]<URL:http://www.nttcom.co.jp/comtech/>.

"Ubiquitous software/service" [online], Nov. 2003 [retrieved from the Internet on Jun. 15, 2004]. <URL:http://www.hitachi.co.jp/Prod/vims/solutions/ssup/airlocation/>.

Korean Office Action dated Jul. 21, 2008 (with English translation of relevant parts).

Austrian Search Report dated May 5, 2008.

* cited by examiner

(ASSET MANAGEMENT DB)

| POSITIONAL INFORMATION | POSITIONAL NAME | ARTICLE ID | ARTICLE NAME |
|---|---|---|---|
| 0001 | ××SECTION | 0 0 0 0 0 0 0 1 | PERSONAL COMPUTER |
| | | ⋮ | ⋮ |
| 0002 | ΔΔ SECTION | 0 0 1 0 1 1 0 1 | SCANNER |
| | | ⋮ | ⋮ |
| ⋮ | ⋮ | ⋮ | ⋮ |

ARTICLE POSITION MANAGEMENT SYSTEM, ARTICLE POSITION MANAGEMENT METHOD, TERMINAL DEVICE, SERVER, AND ARTICLE POSITION MANAGEMENT PROGRAM

CROSS REFERENCE TO RELATED APPLICATION

The present application is a 35 U.S.C. §§ 371 national phase conversion of PCT/JP2005/011229, filed 20 Jun. 2005, which claims priority from Japanese Patent Application No. 2004-188012, filed 25 Jun. 2004, the contents of which are herein incorporated by reference. The PCT International Application was published in the Japanese language.

TECHNICAL FIELD

The present invention relates to an article position management system, an article position management method, a terminal device for article position management, an article position management server, and an article position management program for managing where an asset, product, or any other article is present.

BACKGROUND ART

As a system which manages the position where an article is present, there is available a system in which a barcode is put on each of shelves in a warehouse and a barcode is also put on each of articles stored in the warehouse, so that when an article is stored on a shelf, information of the barcode put on the shelf and information of the barcode put on the article are read by a barcode reader (see, e.g., [1]). In this system, a terminal device with the barcode reader sends the pieces of information of both the barcodes to a management device via wireless communication. The management device stores the pieces of information of both the barcodes sent from the terminal device.

There has also been proposed a system which uses a wireless IC tag (to be referred to as an RFID tag hereinafter) instead of a barcode (see, e.g., [2]). More specifically, an RFID tag as an asset tag is put on an article (an asset), and an RFID tag as a place tag is affixed to a pole, wall, or the like. Information of the asset tag and of the place tag are read by a PDA with an RFID tag reader, and the PDA sends the pieces of information of both the RFID tags to a server over a wireless LAN. The server stores the pieces of information of both the RFID tags sent from the PDA.

As described above, the place in a predetermined region where an article is present can be managed on the basis of information of a tag put on the article and positional information (a barcode put on a shelf or a place tag affixed to a pole, wall, or the like) indicating the place where the article is present. In addition to the above-described systems, there is available a system using GPS-based positional information (see, e.g., [2]). In this system, an RFID tag is put on a container (an article). When a forklift equipped with a GPS receiver places the container in a predetermined position, it reads information of the RFID tag put on the container and sends the information of the RFID tag and positional information acquired by the GPS to a server over a wireless LAN. The server stores the sent pieces of information.

Examples of an RFID tag include an active tag with an internal battery in addition to a passive tag without an internal power supply. There has also been proposed a system in which an active tag is put on an article or the like, antennas for receiving information transmitted from an active tag are installed all over the place, and the position of an article or the like is detected on the basis of the location of an antenna that has received information (see, e.g., FIG. 3 of [3]).

As a system for detecting the position of an article such as a wireless LAN terminal, there has also been proposed a system which uses a wireless LAN base station (see, e.g., [4]). In this system, the position of an article such as a wireless LAN terminal is determined by trilateration based on differences in the received strength and propagation delay time of a radio wave which each of three or more base stations receives from a wireless LAN terminal.

Document [3] describes a system in which tag readers are installed all over the place, and the position of an article is determined by trilateration based on a difference in the received strength of a radio wave which each of three of the tag readers receives from an active tag put on the article (see, e.g., FIG. 2 of [3]).

REFERENCES

[1] Japanese Patent Laid-Open No. 2-163202 (p. 2, FIG. 2)
[2] "All about Wireless IC Tag," Nikkei Business Publications, Inc., Apr. 20, 2004, pp. 70-71 and 111
[3] "NTTCOMWARE TECHNOLOGY" [online], Vol. 8, pp. 12-15, FIGS. 2 and 3, 2004 [retrieved on Jun. 18, 2004]. Retrieved from the Internet: <URL:http://www.nttcom.co.jp/comtech/>
[4] "Ubiquitous software/service" [online], November 2003 [retrieved on Jun. 15, 2004]. Retrieved from the Internet: <URL:http://www.hitachi.co.jp/Prod/vims/solutions/ssup/airlocation/>

DISCLOSURE OF THE INVENTION

If a system as described in [2] which uses an RFID tag (passive tag) as a place tag is to be applied, it cannot be easily applied to an environment in which there are few spots to which a place tag can be affixed although it can be applied to an environment in which there are many spots such as a pole, wall, and shelf to which a place tag can be affixed. It is also conceivable that an active tag may be used as a place tag. However, since the strength of a radio wave sent from an active tag is generally higher than that of a radio wave sent from a passive tag, a terminal device which receives information from a place tag may receive radio waves from a plurality of place tags and may be unable to determine a place. Even if there are many spots to which a place tag can be affixed, an active tag is not suitable for use as a fixed place tag because it has problems of expensiveness and battery drain.

If an RFID tag (regardless of whether it is a passive tag or an active tag) is used as a place tag, an operator of a terminal device cannot easily recognize whether the terminal device is in a region where communication with an RFID tag is established. Accordingly, if place tags are respectively installed at a plurality of spots in a wide region, an article may be left unchecked when, e.g., each article is searched in the region.

A system using the GPS for positional information is not used in a building, for example, where a radio wave cannot be received from the GPS satellites.

In a system for detecting the position of an article or the like on which an active tag is put on the basis of the location of an antenna that has received information from the article or the like, an article and the like in the coverage area of an antenna are all deemed to be present within a predetermined range from the position where the antenna is installed. That is, the predetermined range is deemed to be a single position.

Accordingly, it is difficult to apply the system to a case where place accuracy is desired (detailed positional information is desired).

In a system which determines a position by trilateration using a wireless LAN base station as described in [4] or a tag reader as described in [3], the position detection accuracy is at most 1 m and may decrease depending on the radio wave propagation conditions. Accordingly, it is difficult to apply the system to a case where place accuracy is desired (detailed positional information is desired). Even if the result of detecting the position of an article or the like is greatly deviated from the actual position, the deviation cannot be confirmed.

Under the circumstances, the present invention has as its object to provide an article position management system, an article position management method, a terminal device for article position management, an article position management server, and an article position management program which can determine where an article is present with high accuracy and manage the position of the article such that no article is left unchecked.

MEAN TO SOLVE THE PROBLEMS

An article position management system according to the present invention is characterized by comprising optical signal transmission means for optically transmitting positional information only to a specific region (corresponding to a lighting range), positional information reception means for receiving the positional information transmitted from the optical signal transmission means, identification information readout means for reading out identification information from an identification tag, storage means for storing information indicating a position where an article is present, and article position management means for storing, in the storage means, the positional information received by the positional information reception means in the specific region and the identification information read out by the identification information readout means such that the positional information and identification information are associated with each other.

An article position management system according to another aspect of the present invention is characterized by comprising a terminal device for article position management having optical signal transmission means for optically transmitting positional information only to a specific region, positional information reception means for receiving the positional information transmitted from the optical signal transmission means, and identification information readout means for reading out identification information from an identification tag and a server having storage means for storing information indicating a position where an article is present, wherein the terminal device for article position management includes sending means for sending the positional information received by the positional information reception means in the specific region and the identification information read out by the identification information readout means to the server through a wireless communication medium, and the server includes the storage means for storing information indicating a position where an article is present and article position management means for storing, in the storage means, the positional information and identification information received from the terminal device for article position management through the wireless communication medium such that the positional information and identification information are associated with each other.

The terminal device for article position management may be configured to include alarm means for issuing an alarm if the positional information reception means fails to receive the positional information within a predetermined time after the identification information readout means reads out the identification information.

The terminal device for article position management may be configured to include positional information input means for accepting input of positional information from an operation section if the positional information reception means fails to receive the positional information within the predetermined time after the identification information readout means reads out the identification information.

The identification tag is preferably a wireless tag that transmits the identification information using a received radio wave as power.

The optical signal transmission means is configured to, e.g., comprise a transmission section which includes an infrared LED and transmit the positional information by varying intensity of light emitted from the infrared LED.

The optical signal transmission means may be configured to comprise a transmission section which includes a white LED and transmit the positional information by varying intensity of light emitted from the white LED.

The optical signal transmission means may be configured to also serve as lighting (e.g., include a light-emitting section 151).

The optical signal transmission means transmits, e.g., position identification information or coordinate values as the positional information.

An article position management method according to the present invention is a method for managing a position where an article is present on the basis of identification information, which can identify the article, read out from an identification tag affixed to the article and storing the identification information and positional information of the position where the article is present, characterized in that positional information is optically transmitted only to a specific region, the transmitted positional information is received, the identification information is read out from the identification tag, and the positional information received in the specific region and the read-out identification information are stored in storage means for storing information indicating a position where an article is present such that the positional information and identification information are associated with each other.

A terminal device for article position management according to the present invention is characterized by comprising positional information reception means for receiving positional information transmitted from optical signal transmission means, identification information readout means for reading out identification information from an identification tag, storage means for storing information indicating a position where an article is present, and article position management means for storing, in the storage means, the positional information received by the positional information reception means in a specific region and the identification information read out by the identification information readout means such that the positional information and identification information are associated with each other.

A terminal device for article position management according to another aspect of the present invention is characterized by comprising light-receiving means for receiving light from optical signal transmission means for optically transmitting positional information only to a specific region, positional information extraction means for extracting positional information from the light received by the light-receiving means, identification information readout means for reading out identification information from an identification tag, and sending means for sending the positional information extracted by the positional information extraction means and the identification information read out by the identification information readout means to a server which manages information indicating a position where an article is present through a wireless communication medium.

A server according to the present invention is a server which receives positional information and identification information, which can identify an article, sent from a terminal device for article position management which reads out the identification information from an identification tag affixed to the article and storing the identification information and receives the positional information from optical signal transmission means for optically transmitting the positional information only to a specific region, characterized by comprising storage means for storing information indicating a position where an article is present and article position management means for storing, in the storage means, the positional information and identification information received from the terminal device for article position management through a wireless communication medium such that the positional information and identification information are associated with each other.

An article position management program according to the present invention is characterized by causing a computer mounted in a terminal device for article position management to execute a process of extracting positional information from light received from optical signal transmission means by light-receiving means, a process of reading out identification information from an identification tag, and a process of storing the extracted positional information and read-out identification information in storage means such that the positional information and identification information are associated with each other.

An article position management program according to another aspect of the present invention is characterized by causing a computer mounted in a terminal device for article position management to execute a process of extracting positional information from light received from optical signal transmission means for optically transmitting positional information only to a specific region by light-receiving means, a process of reading out identification information from an identification tag, and a process of sending the extracted positional information and the read-out identification information to a server which manages information indicating a position where an article is present.

An article position management program according to another aspect of the present invention is characterized by causing a computer mounted in an article position management server which receives, from a terminal device for article position management which reads out identification information, which can identify an article, from an identification tag affixed to the article and storing the identification information and receives positional information from optical signal transmission means for optically transmitting the positional information only to a specific region, the positional information and identification information to execute a process of storing the positional information and identification information received from the terminal device for article position management in storage means for storing information indicating a position where an article is present such that the positional information and identification information are associated with each other.

According to the present invention, the use of optical signal transmission means for optically transmitting positional information only to a specific region has the following effects. The place where an article is present can be determined with high accuracy, and article position management can be performed such that no article is left unchecked.

BEST MODE FOR CARRYING OUT THE INVENTION

First Embodiment

Figure 1:
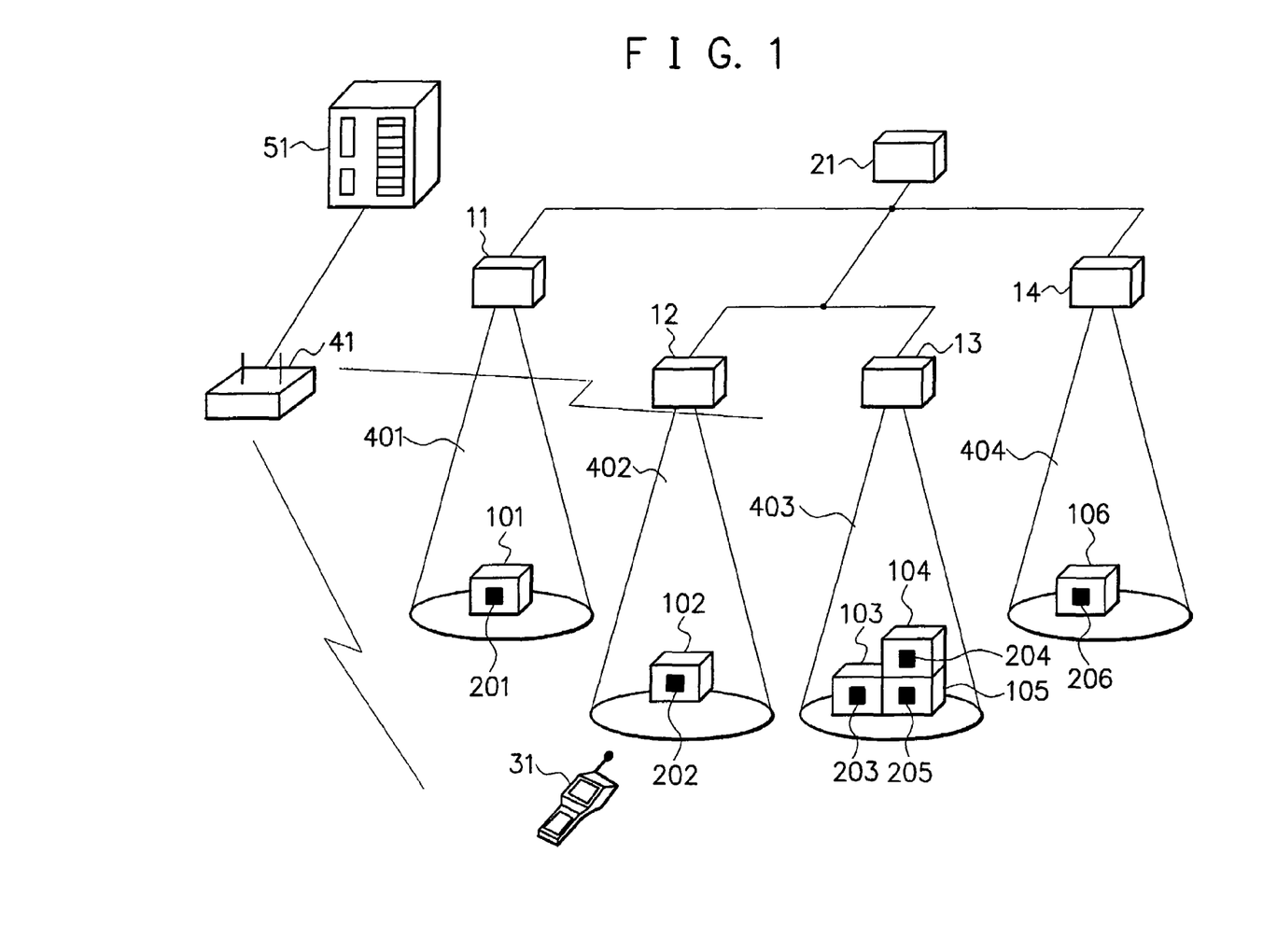
FIG. 1 is a schematic view showing a first embodiment of an article position management system.

An embodiment of the present invention will be explained below with reference to the drawings. FIG. 1 is a schematic view showing a first embodiment of an article position management system according to the present invention. In the system shown in FIG. 1, illumination sections 11 to 14 which illuminate respective predetermined regions with illumination light are installed. Each of the illumination sections 11 to 14 is installed, e.g., at the ceiling of a corresponding room. The illumination sections 11 to 14 each serve as a piece of common lighting equipment instead of a fluorescent lamp or light bulb. Generally, for example, one illumination section is installed in each of regions such as rooms but a plurality of illumination sections may be installed in one region. If the plurality of illumination sections 11 to 14 are installed in one region, lighting ranges 401 to 404 of the corresponding illumination sections 11 to 14 preferably do not overlap one another.

The illumination sections 11 to 14 each repeatedly transmit a piece of unique positional information as an optical signal. Direct-current power is supplied from a power supply section 21 to the illumination sections 11 to 14.

FIG. 1 shows an example in which an article 101 on which an RFID tag 201 is put is present in the lighting range 401, an article 102 on which an RFID tag 202 is put is present in the lighting range 402, articles 103 to 105 on which RFID tags 203 to 205 are respectively put are present in the lighting range 403, and an article 106 on which an RFID tag 206 is put is present in the lighting range 404. A piece of unique article identification information (article ID) is set for each of the RFID tags 201 to 206 put on the articles 101 to 106. Note that in this embodiment, an RFID tag put on an article is a passive tag that transmits an article ID using a received radio wave as power.

In the system, a wireless LAN base station 41 is installed. The base station 41 is installed at a position where it can communicate with a terminal device 31, a terminal device for article position management which is a wireless LAN terminal, while the terminal device 31 is in one of the lighting ranges 401 to 404. The base station 41 is connected to a server 51 which performs article position management. FIG. 1 only shows one base station 41. However, a plurality of base stations may be installed in the system to cover all the lighting ranges in the system (to allow wireless LAN communication with the terminal device 31 in all the lighting ranges). For example, a base station may be installed in each of rooms.

Figure 2:
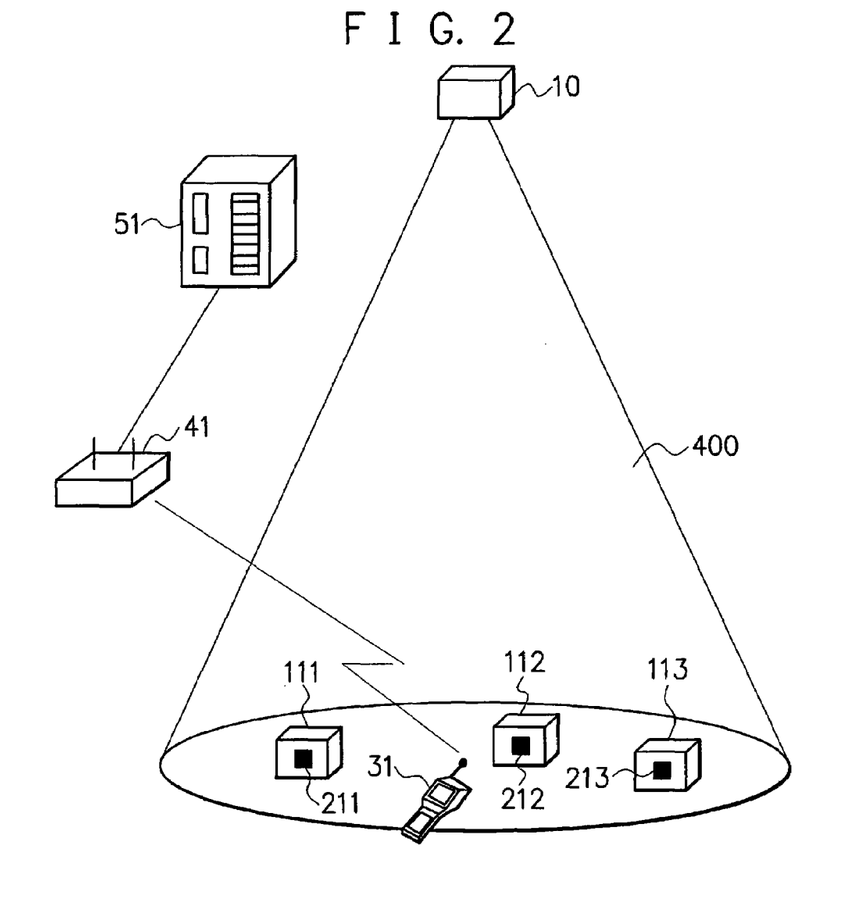
FIG. 2 is a schematic view showing in detail the lighting range of an illumination section.

A case of asset management that manages the position of an article is described as an example. FIG. 2 is a schematic view showing in detail a lighting range. FIG. 2 shows an example in which articles 111 to 113 on which RFID tags 211 to 213 are respectively put are present in a lighting range 400. A unique article ID is set for each of the RFID tags 211 to 213 put on the articles 111 to 113. An illumination section 10 shown in FIG. 2 corresponds to each of the illumination sections 11 to 14 shown in FIG. 1. A lighting range 400 shown in FIG. 2 corresponds to each of the lighting ranges 401 to 404 shown in FIG. 1. When the terminal device 31 enters the lighting range 400, it receives a piece of positional information transmitted by the illumination section 10. When the terminal device 31 comes closer to be within a distance that allows communication with the RFID tags 211 to 213, it can read article IDs from the respective RFID tags 211 to 213. The terminal device 31 is equipped with a function of receiving a piece of positional information transmitted by the illumination section 10 and a tag reader function of reading the article IDs of the RFID tags 211 to 213, in addition to a wireless LAN communication function.

The terminal device 31 sends a piece of positional information received from the illumination section 10 and article IDs received from the RFID tags 211 to 213 to the server 51 through the wireless LAN base station 41.

Figure 3:
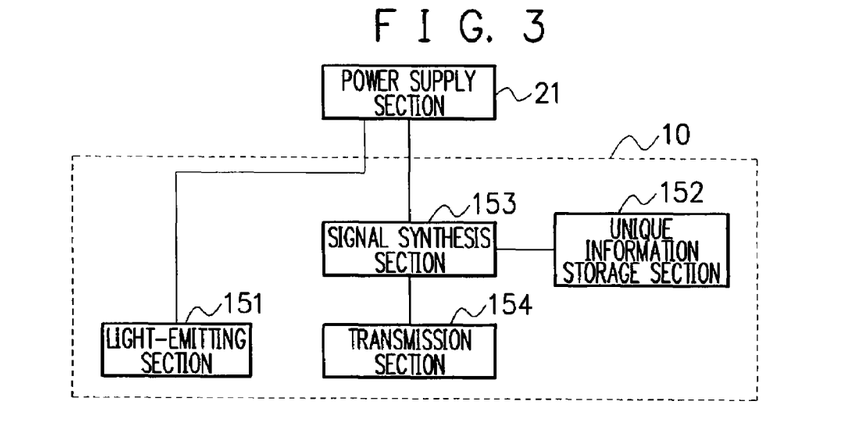
FIG. 3 is an explanatory diagram showing an example of the configuration of the illumination section.

An example of the configuration of the illumination section 10 will be explained next with reference to FIG. 3. In the configuration shown in FIG. 3, a light-emitting section 151 which functions as a piece of lighting equipment is composed of white LEDs. A transmission section 154 is composed of infrared LEDs or white LEDs. The illumination section 10 comprises a unique information storage section 152 which stores a piece of unique positional information. A signal synthesis section 153 controls power supplied to the transmission section 154 depending on a piece of positional information stored in the unique information storage section 152.

Figure 4:
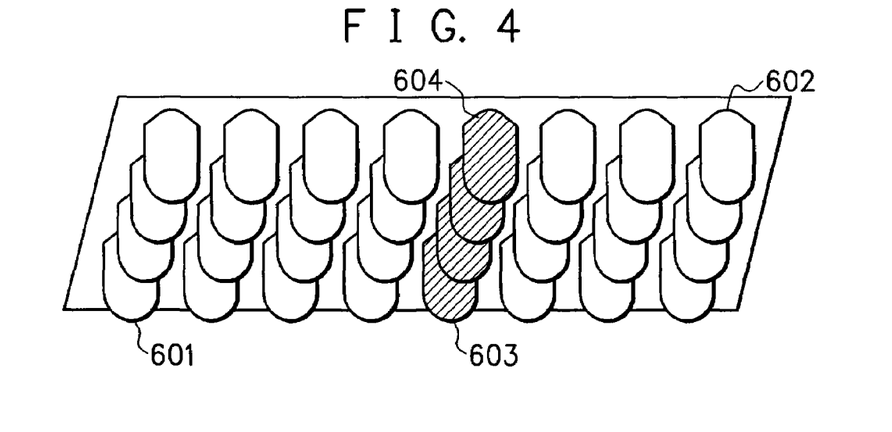
FIG. 4 is an explanatory view showing an example of the specific configuration of a light-emitting section and a transmission section.

FIG. 4 is an explanatory view showing an example of the specific configuration of the light-emitting section 151 and transmission section 154. In the example shown in FIG. 4, white LEDs 601 and 602 which constitute the light-emitting section 151 are arranged in a planar manner. Infrared LEDs or white LEDs (diagonally shaded portions in FIG. 4) 603 and 604 which constitute the transmission section 154 are arranged in a line as part of a plane. Note that in FIG. 4, only some of the infrared LEDs or white LEDs are denoted by reference numerals. The white LEDs 601 and 602 constituting the light-emitting section 151 may be arranged in the shape of a semicylinder, the shape of a hemisphere, or any other shape. The reach (coverage area) of light emitted from the transmission section 154 constituted of the infrared LEDs or white LEDs 603 and 604 corresponds to the lighting range 400.

The coverage area of the transmission section 154 desirably includes that of the light-emitting section 151. If the coverage area of the transmission section 154 includes that of the light-emitting section 151, a place illuminated and lit by the illumination section 10 inevitably falls within the coverage area of the transmission section 154. Accordingly, an operator of the terminal device 31 can easily determine the coverage area of the transmission section 154. In the configuration illustrated in FIG. 4, a lens or the like may be installed outside the transmission section 154 to increase the illuminating angle.

Figure 5:
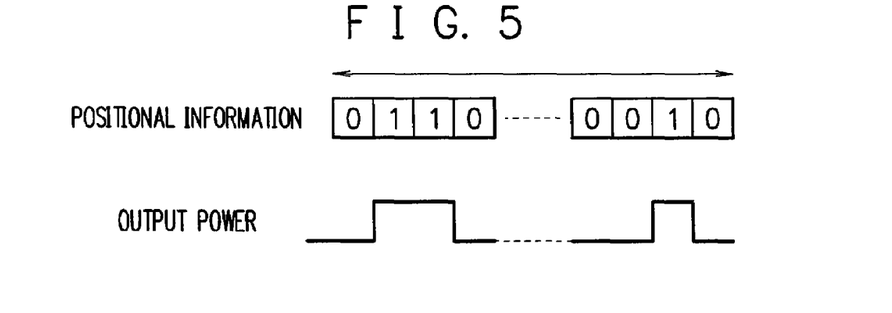
FIG. 5 is an explanatory chart for explaining an example of control by a signal synthesis section.

FIG. 5 is an explanatory chart for explaining an example of control by the signal synthesis section 153. In the example shown in FIG. 5, the signal synthesis section 153 supplies power to the transmission section 154 to transmit "1" in positional information data and supplies no power to the transmission section 154 to transmit "0" in the positional information data. Accordingly, the transmission section 154 emits light when "1" in the positional information data is transmitted and emits no light when "0" in the positional information data is transmitted. As described above, the signal synthesis section 153 controls transmission of a piece of positional information by varying luminescence intensity of the infrared LEDs or white LEDs. Note that the example shown in FIG. 5 is merely an example and that positional information data may be transmitted using any other control method as long as data of "1" and data of "0" can be distinguished from each other by light intensity.

Figure 6:
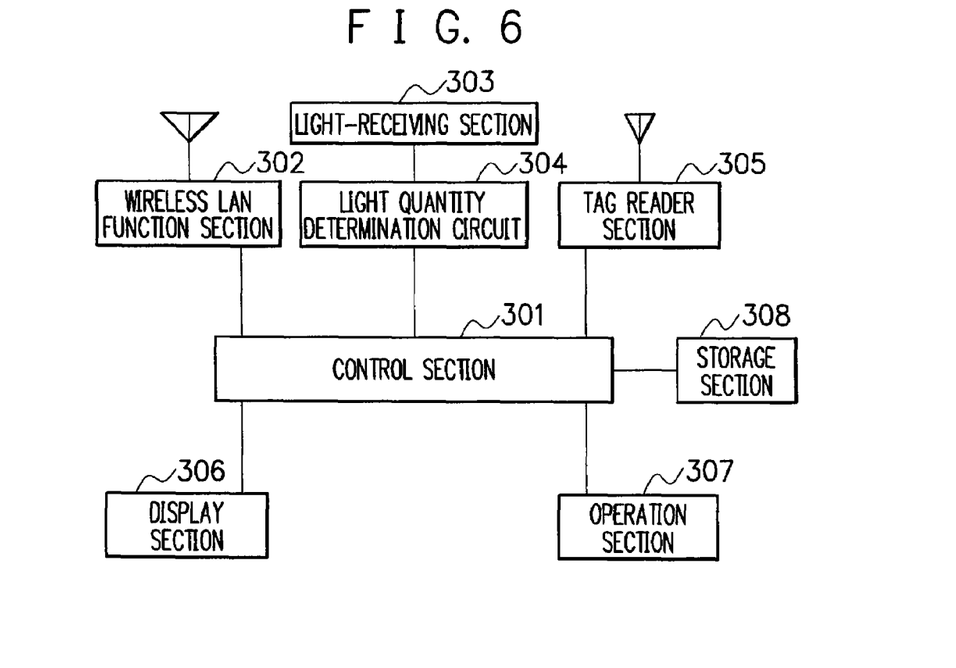
FIG. 6 is a block diagram showing an example of the configuration of a terminal device.

FIG. 6 is a block diagram showing an example of the configuration of the terminal device 31. In the configuration example shown in FIG. 6, the terminal device 31 includes a control section 301 including a microcomputer which operates in accordance with a program stored in a storage section 308, a wireless LAN function section 302 which has a wireless section including a high-frequency signal sending/receiving circuit and communicates with the base station 41 according to a predetermined protocol, a light-receiving section 303 which receives light from the illumination section 10 and outputs an electrical signal with an amplitude corresponding to the quantity of the received light, a light quantity determination circuit 304 which determines the level of an electrical signal output by the light-receiving section 303 and outputs a binarized signal, a tag reader section 305 which supplies a radio wave to an RFID tag and receives an article ID transmitted from the RFID tag, a display section 306 composed of an LCD or the like, and an operation section 307 which has a keyboard and the like.

If white LEDs are used for the transmission section 154 as for the light-emitting section 151, an element which receives light within the spectral range of visible light is used for the light-receiving section 303. On the other hand, if infrared LEDs are used for the transmission section 154, an element which receives infrared rays is used for the light-receiving section 303.

Note that if infrared LEDs are used as the transmission section 154, the terminal device 31 can receive a piece of positional information without being affected by visible light from the light-emitting section 151. If white LEDs are used as the transmission section 154, the terminal device 31 is affected by visible light from the white LEDs of the light-emitting section 151 when it receives a piece of positional information from the white LEDs of the transmission section 154. However, since the quantity of light of the whole of the illumination section 10 (including the transmission section 154 and light-emitting section 151) differs between when the transmission section 154 transmits data of "1" and when it transmits data of "0," the terminal device 31 can identify a piece of positional information. If infrared LEDs are used as the transmission section 154, the directivity of the infrared LEDs is preferably made equal to that of visible light from the light-emitting section 151. This is because coincidence of the illumination range of the infrared LEDs with that of the light-emitting section 151 makes it possible for an operator to easily determine the illumination range of the infrared LEDs, i.e., a positional information receivable range on the basis of the lighting range of visible light from the light-emitting section 151.

In this embodiment, positional information reception means for receiving a piece of positional information transmitted from the transmission section 154 is implemented by the light-receiving section 303, the light quantity determination circuit 304, and the control section 301 (to be more specific, a program executed by the microcomputer). Identification information readout means for reading out an article ID as a piece of identification information from an RFID tag is implemented by the tag reader section 305 and the control section 301 (to be more specific, a program executed by the microcomputer). Sending means for sending a piece of positional information and a piece of identification information to the server 51 through a wireless communication medium (in this example, a wireless LAN) is implemented by the wireless LAN function section 302 and the control section 301 (to be more specific, a program executed by the microcomputer). Alarm means for issuing an alarm if the positional information reception means fails to receive a piece of positional information within a predetermined time is implemented by the control section 301 (to be more specific, a program executed by the microcomputer), the display section 306, and the like. Positional information input means for accepting input of a piece of positional information from an operation section if the positional information reception means fails to receive a piece of positional information within the predetermined time is implemented by the control section 301 (to be more specific, a program executed by the microcomputer). Positional information extraction means for extracting a piece of positional information from light received by light-receiving means is implemented by the control section 301 (to be more specific, a program executed by the microcomputer).

Figure 7:
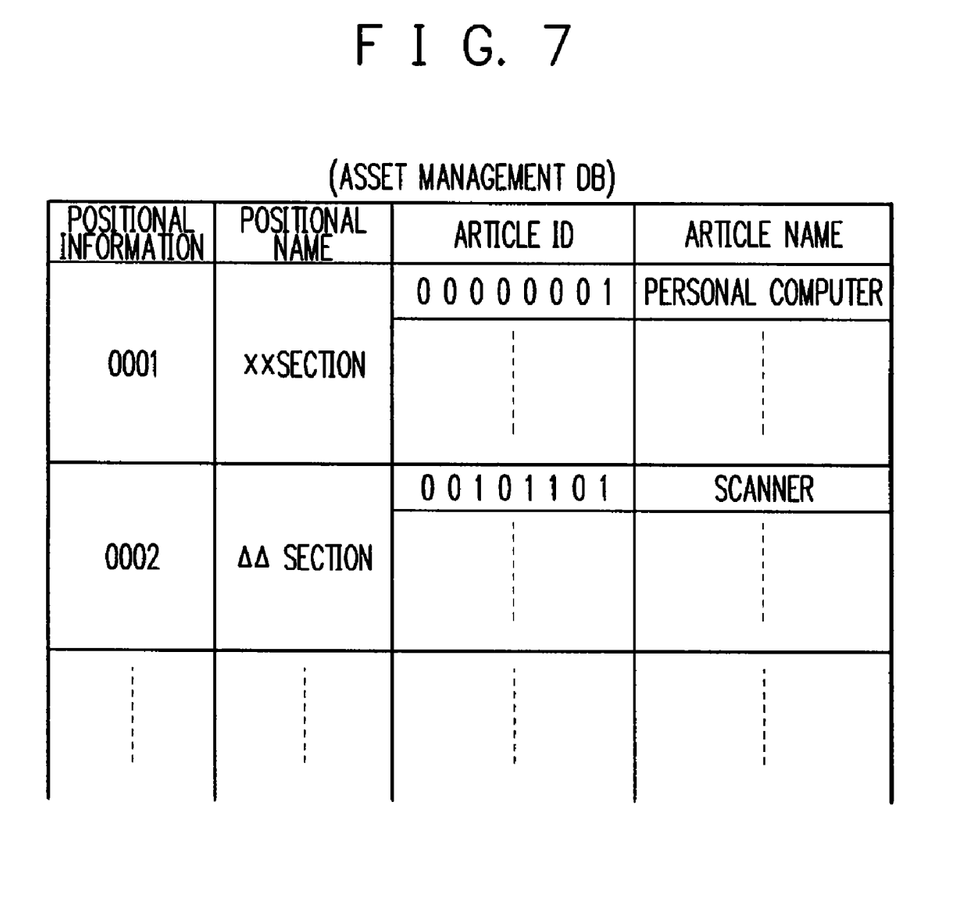
FIG. 7 is an explanatory chart showing an example of the configuration of an asset management database.

FIG. 7 is an example of a database (DB) in which a piece of information indicating the position of articles is stored and an explanatory chart showing an example of the configuration of an asset management database managed by the server. In the example shown in FIG. 7, the article ID and article name of an article which is present at a position indicated by a position name are associated with a piece of positional information and the position name corresponding to the piece of positional information, and the associated pieces of information are stored in the asset management database. In the example shown in FIG. 7, the fact that a personal computer is present at the place named "XX section" and the fact that a scanner is present at the place named "ΔΔ section" are stored in the asset management database. There is an asset database in addition to the asset management database, and the article IDs and article names of all articles that are present in the system are stored in the asset database such that each article ID and the corresponding article name are associated with each other. Article position management means for storing, in storage means, a piece of positional information and a piece of identification information received from the terminal device 31 such that the pieces of information are associated with each other is implemented by a CPU (to be more specific, a program executed by the CPU) of the server 51.

The operation will be explained next. A plurality of illumination sections 10 are installed at respective predetermined spots in the system such as a warehouse, factory, place of business, or the like. When a new article is carried into the system, a unique article ID different from those put on other articles is set to an RFID tag and the RFID tag is attached to the article. The article ID and article name of the article are registered in the asset database. Note that attachment of an RFID tag to an article means integration of the RFID tag and the article by, e.g., affixation or printing.

Figure 8:
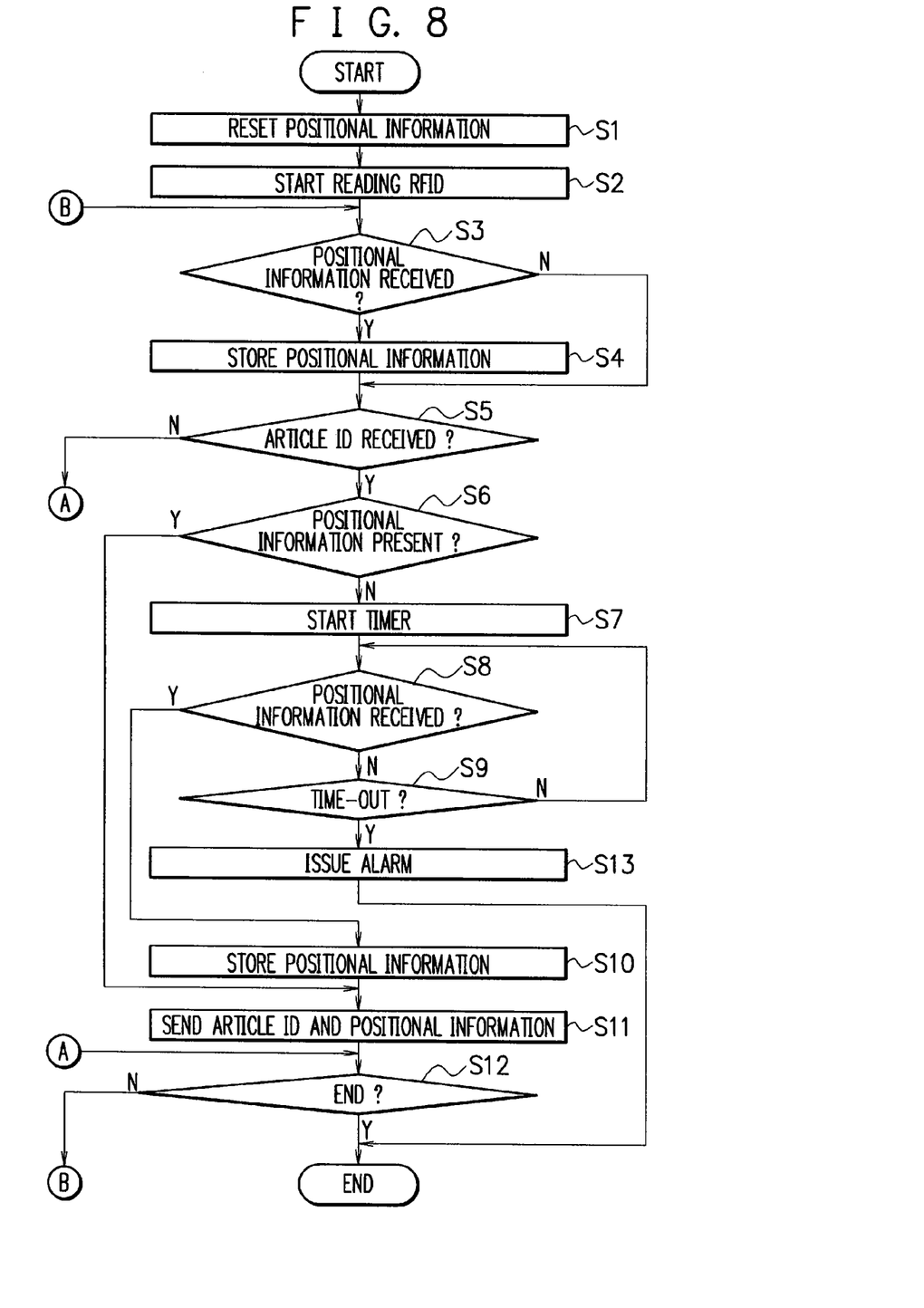
FIG. 8 is a flowchart showing an example of the operation of the terminal device.

FIG. 8 is a flowchart showing an example of the operation of the terminal device 31. An operator of the terminal device 31 initializes a storage region of the storage section 308 for positional information with the operation section 307 of the terminal device 31 when, for example, the operator enters a new place (new lighting range). The control section 301 of the terminal device 31 initializes the storage region for positional information in accordance with user's operation (step S1). Note that although, in this embodiment, a stored piece of positional information is initialized in accordance with operation, the stored piece of positional information may be initialized when a predetermined time has elapsed since the last time the control section 301 received a piece of positional information. Alternatively, the stored piece of positional information may be replaced with a newly received piece of positional information when the new piece of positional information is received.

The control section 301 starts the process of reading an RFID tag (step S2). More specifically, the control section 301 instructs the tag reader section 305 to start radio wave transmission and the process of receiving an article ID from the RFID tag. The tag reader section 305 starts the radio wave transmission and article ID reception process in accordance with the instruction.

When a piece of positional information is received from the illumination section 10 through the light-receiving section 303 and light quantity determination circuit 304 (step S3), the control section 301 then stores the received piece of positional information in the storage section 308 (step S4). Note it is desirable to register all pieces of positional information in the system in advance and decide that no piece of positional information is received from the illumination section 10 when the received piece of positional information does not coincide with any of the registered pieces of positional information.

When the article ID is received from the RFID tag put on an article through the tag reader section 305 (step S5), the control section 301 checks whether positional information is stored in the storage section 308 (step S6). If positional information is stored in the storage section 308, the control section 301 causes the wireless LAN function section 302 to transmit the article ID received from the RFID tag and the piece of positional information stored in the storage section 308 (step S11). The article ID and piece of positional information sent from the wireless LAN function section 302 are conveyed to the server 51 through the base station 41.

If no piece of positional information is stored in the storage section 308, a timer for watching for reception of positional information (step S7) is started. If positional information is successfully received from the illumination section 10 before the timer times out (steps S8 and S9), the control section 301 stores the received piece of positional information in the storage section 308 (step S10) and causes the wireless LAN function section 302 to transmit the article ID received in step S5 and the piece of positional information stored in the storage section 308 (step S11).

If the timer times out before a piece of positional information is received from the illumination section 10, the control section 301 issues an alarm. More specifically, for example, the control section 301 indicates, on the display section 306, that a piece of positional information cannot be received or causes a speaker incorporated in the terminal device 31 to produce an alarm sound.

If the processing has not ended, the flow returns to step S3. The processing is deemed to have ended if, for example, the operator of the terminal device 31 determines that he/she has read the article IDs of all articles within the lighting range 400 of the illumination section 10 by bringing the terminal device 31 close to the articles. Note that to facilitate determination of the end of the processing by an operator, the control section 301 may cause the display section 306 to display a message or may cause the speaker to produce a predetermined sound when an article ID is input from the tag reader section 305.

An operator can collect the article IDs of all the articles within the lighting range 400 only by taking a round in the lighting range 400 while bringing the terminal device 31 close to all the articles within the lighting range 400. Since it is easy to determine whether the lighting is on, it is also easy to determine whether the position of the terminal device 31 is within the lighting range 400.

When an RFID tag or any other wireless information transmission means is used as a place tag instead of the illumination section 10, determination of an information receivable range is more difficult compared with when lighting is used. For this reason, an article ID could be left uncollected in a predetermined region such as a room. For example, an article ID could be left uncollected if an operator has determined that an article is present outside the information receivable range and has not collected its article ID, but the article is actually present within the information receivable range.

In this embodiment, if the terminal device 31 determines that a received piece of positional information does not coincide with any of registered pieces of positional information, it is deemed that no piece of positional information is received from the illumination section 10. However, the present invention is not restricted to the configuration of this manner. If the terminal device 31 sends a piece of positional information to the server, and the server determines that the received piece of positional information does not coincide with any of pieces of positional information in the system, the server may notifies the terminal device 31 accordingly. In that case, an operator of the terminal device 31 again collects the article IDs of articles present within the lighting range 400.

If a large error occurs in position measurement under trilateration with a wireless LAN base station and an active tag, the resulting piece of positional information with the large error is used without correction. In contrast to this, in this embodiment, when a piece of positional information is received, the reliability of the piece of positional information is high. If an article ID is received but a piece of positional information cannot be received, an alarm is issued. Accordingly, an operator can continue processing without anxiety unless an alarm is issued.

When an alarm is issued, an operator may manually input a piece of positional information from the operation section 307. In this case, after the process in step S13 in the flowchart shown in FIG. 8, the control section 301 waits until a piece of positional information is input from the operation section 307. If a piece of positional information is input within a predetermined time, the process in step S11 is executed. This mechanism is useful for complementing the process of automatically collecting pieces of positional information.

Although, in this embodiment, a piece of unique identification information (position identification information) is used as a piece of positional information, coordinate values with a predetermined position as an origin may be used as a piece of positional information. The use of coordinate values has the effect of, e.g., facilitating position management when a plurality of illumination sections are installed in a relatively wide region or the like.

In this embodiment, the illumination section 10 is used as a piece of common lighting equipment. That is, the illumination section 10 with a positional information transmission function can be used instead of lighting apparatus such as a fluorescent lamp or incandescent lamp. Only the transmission section 154 constituting part of the piece of lighting equipment is subjected to positional information transmission control. That is, the signal synthesis section 153 switches only the transmission section 154 of the illumination section 10 from a state in which a voltage is applied to a state in which no voltage is applied and vice versa. Accordingly, if the transmission section 154 is composed of infrared LEDs, the quantity of visible light from the illumination section 10 does not change even if the transmission section 154 transmits a piece of identification information. If the transmission section 154 is composed of white LEDs, the transmission section 154 only forms part of the illumination section 10. Accordingly, even if the transmission section 154 transmits a piece of identification information, a change in the quantity of visible light from the illumination section 10 can be suppressed to prevent a person from perceiving the change in the quantity of light.

Note that light-emitting means in the illumination section 10 may be entirely composed of white LEDs which is under the control of the signal synthesis section 153 without dividing the illumination section 10 into the light-emitting section 151 and transmission section 154. In this case, however, the signal synthesis section 153 is configured to perform current control to reduce the quantity of light of the white LEDs when data of "0" is transmitted.

Figure 9:
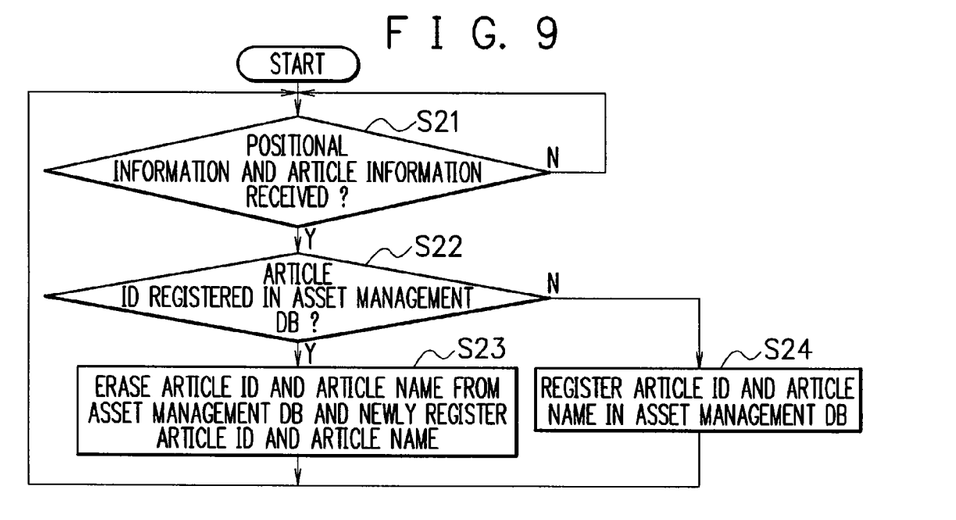
FIG. 9 is a flowchart showing an example of the operation of a server.

FIG. 9 is a flowchart showing an example of the operation of the server. When a piece of positional information and an article ID are received from the terminal device 31 through the base station 41 (step S21), a control section (CPU) of the server 51 checks whether the received article ID is already registered in the asset management database (step S22). If the article ID has already been registered, the control section erases the article ID and a corresponding article name from the asset management database. At the same time, the control section extracts an article name corresponding to the received article ID from the asset database and registers the article ID and article name in the asset management database such that they are associated with the piece of positional information received from the terminal device 31 (step S23). This process can occur when the position of an article is changed since the article is registered in the asset management database last time.

If the received article ID has not been registered in the asset management database, the control section extracts an article name corresponding to the received article ID from the asset database and newly registers the article ID and article name in the asset management database such that they are associated with the piece of positional information received from the terminal device 31 (step S24).

With the above-described processing, the position in the system where each article is present is registered in the asset management database.

Note that although, in this embodiment, the terminal device 31 sends an article ID and a piece of positional information to the server 51 when it receives the article ID, it may send a piece of positional information to the server 51 only when it first receives the piece of positional information. In this case, the terminal device 31 sends only an article ID when it receives the article ID. Even with this configuration, the server 51 can associate a received article ID with a piece of positional information received last time until it receives a piece of positional information next time. That is, if the terminal device 31 is configured to send a piece of positional information to the server 51 only when it first receives the piece of positional information, it virtually associates a piece of positional information and an article ID with each other and sends the pieces of information to the server 51.

Second Embodiment

Figure 10:
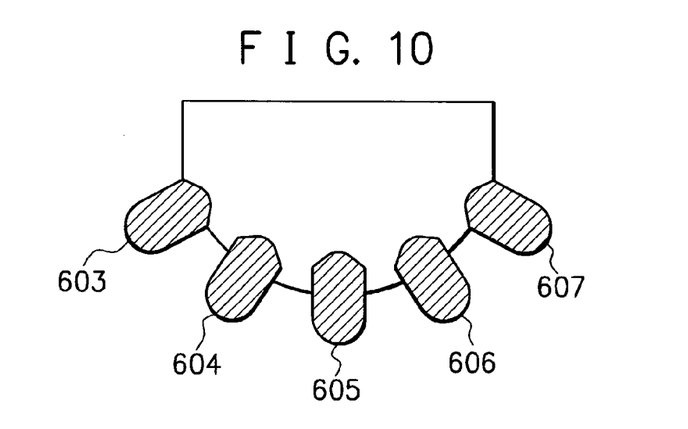
FIG. 10 is an explanatory view showing an example of the configuration of a transmission section according to a second embodiment.

In the first embodiment, the illumination section 10 also serves as a piece of lighting equipment. However, a piece of existing lighting equipment such as a fluorescent lamp or incandescent bulb may be taken advantage of, and only a transmission section 154 may be installed. FIG. 10 is an explanatory view showing an example of the configuration of the transmission section 154 according to a second embodiment in which only the transmission section 154 is installed. In the configuration shown in FIG. 10, the transmission section 154 is composed of a plurality of infrared LEDs or white LEDs 603 to 607. The transmission section 154 is installed, e.g., on the ceiling of a room. Note that the configuration shown in FIG. 10 is merely an example and that the configuration of the transmission section 154 according to the second embodiment is not limited to this figure.

Figure 11:
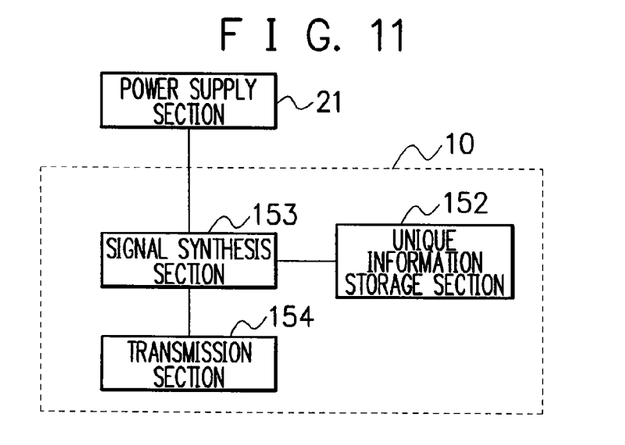
FIG. 11 is a block diagram showing an example of the configuration of an illumination section according to the second embodiment.

FIG. 11 is a block diagram showing an example of the configuration of an illumination section 10 according to the second embodiment. As compared to the illumination section 10 shown in FIG. 2, the light-emitting section 151 is omitted.

The configuration is the same as that of the first embodiment shown in FIG. 2 except for the omission.

Even with the illumination section 10 as shown in FIG. 11, a terminal device 31 and a server 51 operate in the same manner as in the first embodiment and can execute asset management.

Third Embodiment

The embodiments described above each have taken as an example a case where asset management is performed. The present invention, however, is not limited to a system that performs asset management. For example, the present invention can be applied to management of products stored in a warehouse or the like. In this case, illumination sections 10 are installed all over the warehouse. Transport means such as a forklift equipped with a terminal device 31 itself as in the embodiments or the function of the terminal device 31 is used. An RFID tag having a unique article ID set thereon is put in advance on each of products or the like to be transported by the transport means.

When the forklift places an article in a predetermined position in the warehouse, the terminal device 31 reads a piece of positional information received from the illumination section 10 and the article ID of the unloaded article. The terminal device 31 sends the piece of positional information and article ID to a server 51 through a wireless LAN base station 41. The server stores the piece of positional information and article ID received from the terminal device 31 such that they are associated with each other. When a product is transferred from the warehouse, the server sends information identifying the product to be transferred and the position of the product to the terminal device 31 through the base station 41. An operator of the transport means can immediately recognize the product to be transferred and the position of the product.

Fourth Embodiment

In the embodiments, the terminal device 31 communicates with the server 51 through the wireless LAN base station 41. In contrast, a terminal device 31 may be a terminal device (e.g., a cellular phone) that communicates with a server 51 through a cellular phone network. In this case, a camera section of a cellular phone with a built-in camera may be used as a light-receiving section 303 of the terminal device 31. For example, the terminal device 31 can be implemented by adding a tag reader section 305 and light quantity determination circuit 304 to a cellular phone and further adding a path for supplying a signal from a light-receiving element such as a CCD to the light quantity determination circuit 304 as well as a path for supplying a signal from the light-receiving element in a camera section to an electric circuit for shooting.

The use of a cellular phone as the terminal device 31 makes it possible to make and take calls. Accordingly, if this configuration is applied to product management or the like, a manager on the server side and an operator of the transport means speak over the telephone, thereby increasing the operating efficiency.

Fifth Embodiment

In the embodiments, storage means for storing article position management information (e.g., an asset management database) is provided on the server 51 side. However, a terminal device 31 may comprise storage means for storing article position management information (see FIG. 7). In this case, the terminal device 31 need not send a piece of positional information received from a transmission section 154 and an article ID read out from an RFID tag to a server 51. The processes in steps S22 to S24 illustrated in FIG. 9, i.e., the process of storing in the storage means positional information received from the transmission section 154 and identification information read out from an identification tag such that pieces of information are associated with each other, are executed by a control section 301 (to be more specific, a program executed by the control section 301) of the terminal device 31. Note that the processes in steps S22 to S24 may be simplified. For example, the terminal device 31 need not store an article name in the storage means and may store only pieces of positional information and article IDs such that they are associated with each other. After collection of positional information and article ID of each article is completed, the terminal device 31 may be connected to a management device which finally manages an article such as an asset, and the memory content of the storage means of the terminal device 31 may be uploaded to the management device.

INDUSTRIAL APPLICABILITY

The present invention can be applied to, e.g., a case where asset management or product management is performed in a warehouse, factory, place of business, or the like.

DESCRIPTION OF SYMBOLS 10-14 illumination section
101-106, 111-113 article
201-206, 211-213 RFID tag
21 power supply section
31 terminal device
41 base station
51 server
151 light-emitting section
152 unique information storage section
153 signal synthesis section
154 transmission section 301 control section
302 wireless LAN function section
303 light-receiving section
304 light quantity determination circuit
305 tag reader section
306 display section
307 operation section
308 storage section
400-404 lighting range

The invention claimed is:

1. An article position management system that manages a position of an article on the basis of identification information read out from an identification tag that is affixed to the article and stores the identification information used to identify the article, and further on the basis of positional information of the position where the article is present, characterized by comprising:

optical signal transmission means configured for optically transmitting positional information only to a specific region;

positional information reception means configured for receiving the positional information transmitted from said optical signal transmission means;

identification information readout means configured for reading out the identification information from the identification tag;

storage means configured for storing information indicating the position where the article is present; and article position management means configured for storing in said storage means the positional information received by said positional information reception means in the specific region and the identification information read out by said identification information readout means such that the positional information and identification information are associated with each other.

2. The article position management system according to claim 1, wherein the identification tag is a wireless tag which transmits the identification information using a received radio wave as power.

3. The article position management system according to claim 1, wherein the optical signal transmission means comprises a transmission section which includes an infrared LED and transmits the positional information by varying intensity of light emitted from the infrared LED.

4. The article position management system according to claim 1, wherein the optical signal transmission means comprises a transmission section which includes a white LED and transmits the positional information by varying intensity of light emitted from the white LED.

5. The article position management system according to claim 4, wherein the optical signal transmission means also serves as lighting.

6. The article position management system according to claim 1, wherein the optical signal transmission means transmits position identification information or coordinate values as the positional information.

7. An article position management system that manages a position of an article on the basis of identification information read out from an identification tag that is affixed to the article and stores the identification information used to identify the article, and further on the basis of positional information of the position where the article is present, characterized by comprising:

a terminal device configured for article position management having optical signal transmission means configured for optically transmitting positional information only to a specific region, positional information reception means configured for receiving the positional information transmitted from the optical signal transmission means, and identification information readout means configured for reading out the identification information from the identification tag; and a server having storage means configured for storing information indicating the position where the article is present, wherein said terminal device for article position management includes sending means configured for sending the positional information received by the positional information reception means in the specific region and the identification information read out by the identification information readout means to said server through a wireless communication medium, and said server includes the storage means configured for storing information indicating the position where the article is present and article position management means configured for storing, in the storage means, the positional information and identification information received from said terminal device for article position management through the wireless communication medium such that the positional information and identification information are associated with each other.

8. The article position management system according to claim 7, wherein said terminal device for article position management includes alarm means for issuing an alarm if the positional information reception means fails to receive the positional information within a predetermined period of time after the identification information readout means reads out the identification information.

9. The article position management system according to claim 7, wherein said terminal device for article position management includes positional information input means for accepting input of positional information from an operation section if the positional information reception means fails to receive the positional information within the predetermined period of time after the identification information readout means reads out the identification information.

10. The article position management system according to claim 7, wherein the identification tag is a wireless tag which transmits the identification information using a received radio wave as power.

11. The article position management system according to claim 7, wherein the optical signal transmission means comprises a transmission section which includes an infrared LED and transmits the positional information by varying intensity of light emitted from the infrared LED.

12. The article position management system according to claim 7, wherein the optical signal transmission means comprises a transmission section which includes a white LED and transmits the positional information by varying intensity of light emitted from the white LED.

13. The article position management system according to claim 7, wherein the optical signal transmission means transmits position identification information or coordinate values as the positional information.

14. An article position management method for managing a position of an article on the basis of identification information read out from an identification tag that is affixed to the article and stores the identification information used to identify the article, and further on the basis of positional information of the position where the article is present, characterized in that positional information is optically transmitted only to a specific region,
the transmitted positional information is received,
the identification information is read out from the identification tag, and
the positional information received in the specific region and the read-out identification information are stored in storage means for storing information indicating the position where the article is present such that the positional information and identification information are associated with each other.

15. A terminal device for article position management that reads out identification information from an identification tag that is affixed to the article and stores the identification information used to identify the article, and receives positional information from optical signal transmission means for optically transmitting the positional information only to a specific region in order to manage a position where the article is present, characterized by comprising:
   positional information reception means configured for receiving the positional information transmitted from the optical signal transmission means;
   identification information readout means configured for reading out the identification information from the identification tag;
   storage means configured for storing information indicating the position where the article is present; and
   article position management means for storing, in said storage means, the positional information received by said positional information reception means in the specific region and the identification information read out by said identification information readout means such that the positional information and identification information are associated with each other.

16. A terminal device for article position management that reads out identification information from an identification tag that is affixed to the article and stores the identification information used to identify the article, and receives positional information from optical signal transmission means for optically transmitting the positional information only to a specific region in order to manage a position where the article is present, characterized by comprising:
   light-receiving means configured for receiving light from the optical signal transmission means;
   positional information extraction means configured for extracting positional information from the light received by said light-receiving means;
   identification information readout means configured for reading out the identification information from the identification tag; and
   sending means configured for sending the positional information extracted by said positional information extraction means and the identification information read out by said identification information readout means to a server which manages information indicating the position where the article is present through a wireless communication medium.

17. An article position management server that receives positional information and identification information sent from a terminal device configured for article position management reading out the identification information from an identification tag that is affixed to the article and stores the identification information used to identify the article, and receives the positional information from optical signal transmission means configured for optically transmitting the positional information only to a specific region in order to manage a position where the article is present, characterized by comprising:
   storage means configured for storing information indicating the position where the article is present and article position management means configured for storing, in said storage means, the positional information and identification information received from the terminal device for article position management through the wireless communication medium such that the positional information and identification information are associated with each other.

18. An article position management program for causing a computer mounted in a terminal device for article position management which reads out identification information from an identification tag that is affixed to the article and stores the identification information used to identify the article, and receives positional information from optical signal transmission means for optically transmitting the positional information only to a specific region in order to manage a position where the article is present to execute:
   extracting positional information from light received from the optical signal transmission means by light-receiving means,
   reading out the identification information from the identification tag; and
   storing the extracted positional information and read-out identification information in storage means such that the positional information and identification information are associated with each other.

19. An article position management program configured for causing a computer mounted in a terminal device for article position management, which reads out identification information from an identification tag that is affixed to the article and stores the identification information used to identify the article, and receives positional information from optical signal transmission means for optically transmitting the positional information only to a specific region in order to manage a position where the article is present to execute:
   extracting positional information from light received from the optical signal transmission means by light-receiving means,
   reading out the identification information from the identification tag; and
   sending the extracted positional information and the read-out identification information to a server which manages information indicating the position where the article is present.

20. An article position management program for causing a computer mounted in an article position management server which receives from a terminal device positional information received from optical signal transmission means, and identification information read out from an identification tag, the terminal device being used for article position management, reading out identification information from the identification tag that is affixed to the article and stores the identification information used to identify the article, and receiving positional information from the optical signal transmission means for optically transmitting the positional information only to a specific region in order to manage a position where the article is present to execute:
   storing the positional information and identification information received from the terminal device for article position management in storage means for storing information indicating the position where the article is present such that the positional information and identification information are associated with each other.

* * * * *